United States Patent [19]

Moon et al.

[11] Patent Number: 4,528,199
[45] Date of Patent: Jul. 9, 1985

[54] SILAGE PRODUCTION FROM FERMENTABLE FORAGES

[75] Inventors: Nancy J. Moon, Griffin, Ga.; Lane O. Ely, Fort Collins, Colo.; E. M. Sudweeks, Kilgore, Tex.

[73] Assignee: University of Georgia Research Foundation, Inc., Athens, Ga.

[21] Appl. No.: 461,001

[22] Filed: Jan. 26, 1983

[51] Int. Cl.$^3$ .................. A23K 1/00; A23K 3/02; C12R 1/25
[52] U.S. Cl. .................. 426/53; 426/623; 426/636; 435/857
[58] Field of Search .................. 426/49, 52, 53, 54, 426/61, 623, 630, 635, 636; 435/857

[56] References Cited

U.S. PATENT DOCUMENTS 3,459,554  8/1969  Hashimoto ............................ 426/53
3,857,984  12/1974  Pike ...................................... 426/54

OTHER PUBLICATIONS

Moon, Opt. of Lactic Acid Ferm. of Frozen Vege, Process Wastes: Model Sys. for Producing Animal Feeds, Journal of Food Science, vol. 44 (1979), pp. 1460–1465.

Primary Examiner—Raymond Jones
Assistant Examiner—Marianne S. Minnick
Attorney, Agent, or Firm—Oblon, Fisher, Spivak, McClelland & Maier

[57] ABSTRACT

A method for the production of silage from a fermentable forage substrate by admixing *Lactobacillus plantarum* 2B bacteria with a fermentable forage substrate. The bacteria is added in an amount effective to lower the pH of the forage substrate to a pH at which the fermentable forage is stabilized and rendered substantially free of butyric acid producing bacteria.

9 Claims, 15 Drawing Figures

SILAGE PRODUCTION FROM FERMENTABLE FORAGES

BACKGROUND OF THE INVENTION

1. Field of the Invention

The present invention relates to a process for the production of a silage from a fermentable forage by anaerobic fermentation in the presence of a Lactobacillus bacterium.

2. Description of the Prior Art

A silage is the product of anaerobic preservation of a moist forage crop or crop residue by acidification caused by fermentation. Although the exact chemical and biochemical reactions responsible for the production of a stable silage are unknown, the silage fermentation process can be explained by considering only the principal reaction, i.e., the conversion of carbohydrates into organic acids, thereby lowering the pH and preserving the ensiled materials. However, it must be recognized that this is a simplification. The actual process taking place includes many of the known biochemical and microbiological changes which typically occur in fermentation.

The principal aim of preparing silages is the production of a material useful for feeding animals which can be preserved for long periods of time with a minimum loss of nutrients. For some time it has been recognized that silage production is benefited by maintaining anaerobic conditions and by inhibiting clostridia bacteria. Anaerobic conditions are needed in order to inhibit aerobic microorganisms which otherwise would waste the nutrient resources of the feedstuff through oxidative activities. Furthermore, clostridia are known to cause protein destruction under anaerobic conditions, and their activity must be reduced if maximum retention of nutrient value is to occur.

Furthermore, it has also been known that silage fermentations are benefited by the presence of lactate-producing bacteria. Under ideal fermentation condition, the primary product produced from carbohydrates in the forage material is lactic acid. There are two general pathways that lead to the production of lactic acid from carbohydrates by bacteria. The homofermentative pathway involves the conversion of glucose into two molecules of lactate. The heterofermentative pathway involves the conversion of one molecule of glucose into one molecule each of lactate, ethanol, and carbon dioxide. The homofermentative pathway is especially preferred in silage fermentations since all dry matter is preserved for use as a nutrient (i.e., there is no carbon dioxide production) and energy loss is also minimized. In view of these advantages, rapid production of lactic acid by a homolactic pathway as the primary means for acidifying the silage is preferred.

As previously indicated, it is also desirable to minimize the activity of clostridia during the ensiling process. Although clostridial fermentation also produces acids and may eventually result in formation of a silage, nutrient loss is much greater than for lactate ensiling processes. For example, lactic acid itself is converted by clostridia into butyric acid, two carbon dioxide molecules, and two hydrogen molecules (using two lactic acid molecules as starting material). This results in a dry matter loss of more than 50%. Other clostridial pathways result in the degradation of proteins. For example, amino acids are de-aminated or oxidized to produce ammonia and carbon dioxide. In addition to the obvious destruction of nutrients, the production of basic components like ammonia raises the pH of the resulting silage and prevents acid-forming bacteria from reducing the pH to the level required for long-term storage.

Because of the desirability of producing rapid lactic acid production, various publications have suggested inoculating silage feedstuffs with additional latate-producing bacteria. For example, M. E. McCullough, *Feedstuffs*, 49, 49–52 (1977), suggests desirable characteristics for a potential organism that would be satisfactory for use in silage production. Typical characteristics include the following: (1) the organism should have a high growth rate and be able to compete with and dominate other organisms likely to occur in silage; (2) the organism should be homofermentative; (3) the organism should be acid-tolerant and produce a final pH of 4.0 rapidly; (4) the organism should be able to ferment glucose, fructose, and sucrose, and preferably be able to ferment fructosans and pentosans; and (5) the organism should not react further with organic acids. However, as pointed out in McCullough's article, no organism having all of these desirable characteristics was known. Accordingly, there remains a need for a lactate-producing organism suitable for improving the production of silage from fermentable forage materials.

SUMMARY OF THE INVENTION

It is an object of the present invention to provide a method for producing silage from a fermentable forage substrate suitable for use as an animal feedstuff.

It is a further object of this invention to provide a method for the production of silage which results in rapid acidification of silage, thereby inhibiting the growth of coliform and gram negative butyric acid producing anaerobes and the growth of yeasts and molds.

It is yet another object of this invention to provide a method for the production of silage which produces a silage having a maximal nutrient and energy value.

These and other objects of the invention as will hereinafter become more readily apparent have been accomplished by providing a method for the production of silage from a fermentable forage or forage-like substrate suitable for use as an animal feedstuff, which comprises the steps of admixing *Lactobacillus plantarum* 2B bacteria with a fermentable forage substrate, said bacteria being inoculated in an amount effective to lower the pH of said substrate to a pH at which said substrate is stabilized and rendered substantially free of butyric acid producing bacteria, and allowing fermentation to proceed under anaerobic conditions until a silage stable to anaerobic storage is obtained.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawing, wherein.

DESCRIPTION OF THE PREFERRED EMBODIMENTS

Figure 1:
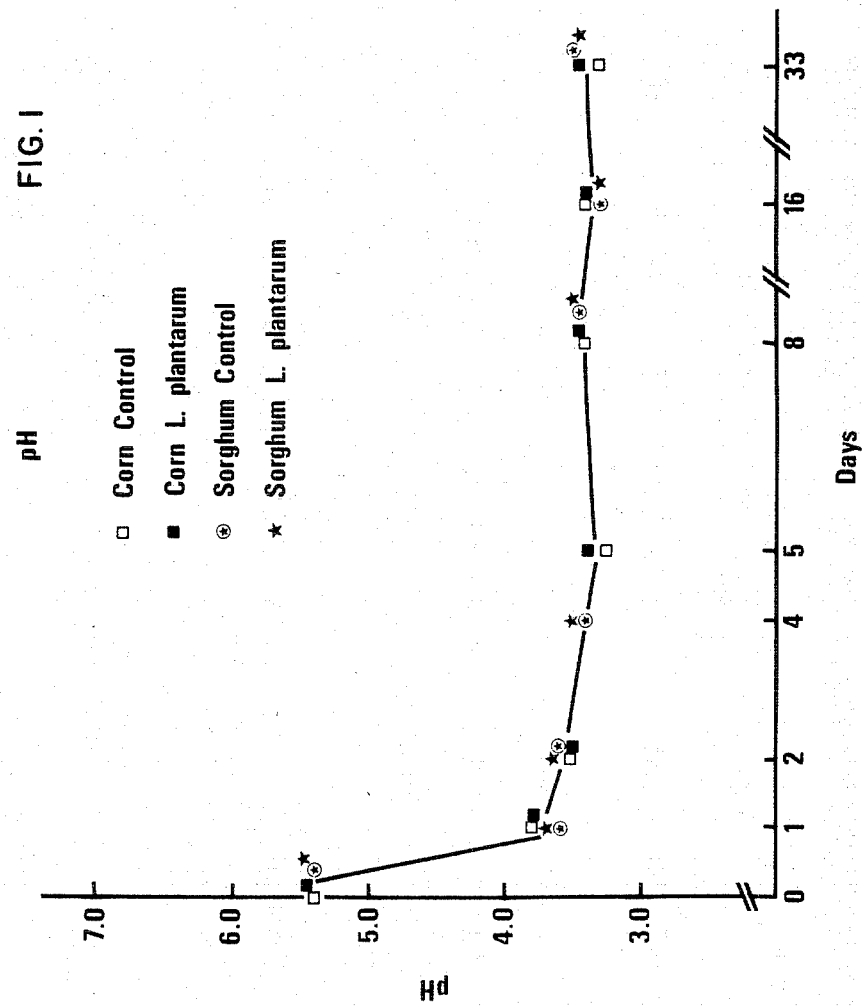
FIG. 1 shows a plot of silage pH for corn and sorghum silages versus time.

Microorganisms suitable for the procedures described herein are exemplified by cultures now on deposit with the American Type Culture Collection, 12301 Parklawn Drive, Rockville, Md. 20852, USA. These cultures were deposited on Jan. 18, 1983, and are identified by ATCC No. 39268. Prior to this deposit, *L. plantarum* 2B was not available outside the laboratory of the inventors.

The present invention has resulted from the discovery that a particular strain of bacteria, *Lactobacillus plantarum* 2B, is useful for the production of silage from a fermentable forage or forage-like substrate. *L. plantarum* 2B was isolated from a successful corn silage fermentation which was not inoculated with any supplemental bacteria.

*L. plantarum* 2B is a Gram positive, short microaerophilic rod which is a catalase negative mesophile and has a temperature growth range of 15° C. to 45° C. Its primary end-product of metabolism is lactic acid. The fermentation pattern for this organism is shown in the following table:

| Substrate | Fermentation |
| --- | --- |
| arabinose | − |
| fructose | + |
| galactose | + |
| glucinate | + (with gas formation) |
| lactose | + |
| maltose | + |
| mannitol | + |
| mannose | + |
| raffinose | − |
| rhamnose | − |
| ribose | + |
| sorbitol | + |
| glucose | + |

-continued

| Substrate | Fermentation |
| --- | --- |
| sucrose | + |
| trehalose | + |
| xylose | − |
| glycerol | − |
| malic acid | − |
| citric acid | − |
| melibiose | − |
| melezitose | + |
| lactate | − |
| sorbose | + |
| propionate | − |

*L. plantarum* 2B has previously been used in a model system intended to demonstrate the feasibility of producing animal feeds from frozen vegetable process waste; Moon, *J. Food Sci.*, 44, 1460–1465 (1979). However, the significant difference in nutrient content of the substrate prevented this preliminary work from being applied directly to the production of silage from forage crops. Vegetable wastes contain a higher level of fermentable nutrients than do traditional forages. The freeze-thaw process that the wastes had undergone disrupted cell structures and provided more soluble nutrients than are available in a typical forage. Additionally, the freeze-thaw process destroyed many competing bacteria that would normally be present. The control of the population of naturally occurring bacteria is an important characteristic of the method of the present invention.

This is particularly true in view of typical teachings in the prior art that certain bacteria could be used with various fermentation processes of traditional forages if and only if a nutrient supplement was added to the substrate. In the past, addition of nutrient supplements to forage crops has been suggested in order to increase the available carbohydrate for lactate production. However, carbohydrate addition is not without drawbacks. There is increased danger of secondary fermentation once the silage is uncovered or removed from the silo for feeding. The secondary fermentation includes growth of acid-tolerant yeast and molds which grow well in silages with a high level of water soluble carbohydrates. This results in lowering the nutrient value of the silage and possibly other detrimental effects. Accordingly, it was a particularly preferred goal of the present invention to discover a method of producing silage that did not require the addition of a supplemental nutrient, although, of course, a supplemental nutrient may be added if desired to increase the rate of bacterial growth.

*Lactobacillus plantarum* 2B satisfies the previously cited criteria for organisms useful in silage fermentation: (1) it has a high growth rate and is able to compete with and dominate other organisms likely to occur in silage; (2) it is homofermentative; (3) it is acid-tolerant and produces a final pH of 4.0 or less quickly; (4) it is able to ferment glucose, fructose, sucrose and other complex sugars; (5) its reactivity with organic acids is negligible; and (6) it grow well from 15° C. to 45° C., providing fermentation over a wide range of temperatures and climates.

The present invention is carried out admixing *Lactobacillus plantarum* 2B with a fermentable forage or forage-like substrate. By forage is meant any plant material high in fiber suitable for consumption by domestic animals including cattle, sheep, goats, and the other ruminants. The forage material must be fermentable; i.e., it must be capable of undergoing fermentation in the presence of acid-producing bacteria to produce a silage. Suitable examples of forage materials, not intended to be limiting, include corn, alfalfa, wheat, rye, oats, sorghum, clover and grass. Many variations on the ensiling process for producing a silage from these fermentable forage substrates are known. Generally, ensiling comprises carrying out an anaerobic fermentation of the forage substrate using the naturally occurring bacteria present in the substrate when it is harvested. The present invention does not modify normal ensiling processes except for providing a specific species and strain of bacteria which has been demonstrated to produce superior results in the ensiling process. Superior results have been obtained for microbial counts for all forages used to date with the present invention. The present method, utilizing a particular strain of bacterium, gives unsurpassed control of other bacterial populations, such as coliforms and clostridia, as well as control of yeast and mold populations. Clostrida are capable of breaking down hexose and lactate to butyrate, resulting in a loss of dry matter. Butyrate is a weaker acid and the pH of the silage will rise which can present a favorable medium for putrefactive clostridia which cause the destruction of amino acids and a loss in nitrogen. Coliforms and other gram negative bacteria can cause loss of dry matter and a lower pH early in the fermentation process. Yeasts and molds cause deterioration of silages following the opening of the silo and exposure to air. Treatment of silages with *L. plantarum* 2B increases the stability of the silage after opening by decreasing the rate of heating of the silage and increasing stability in the feeding stage from two to four days. Thus, the method of the present invention provides remarkable potential for improving the quality of the silage product. Additionally, improved nutritional value for silages of the invention over control silages to which no *L. plantarum* 2B was added have been demonstrated for such widely varying forages as wheat, sorghum, and alfalfa.

Furthermore, the particular strain of bacterium used in the present invention does not require the addition of any supplement or other vegetative matter containing soluble carbohydrates, such as would be suitable for human consumption when used with traditional forages. As previously mentioned, many lactate-producing bacteria require the presence of additional carbohydrates in order to produce a usable silage. In the present invention, the forage substrate can act as the sole source of and contains all nutritional requirements for the *Lactobacillus plantarum* 2B organism. Accordingly, the present invention can be carried out by admixing L. plantarum 2B with the fermentable forage substrate as the only source of nutritional requirements for the microorganism as well as by admixing *L. plantarum* 2B in the presence of such supplements.

*L. plantarum* 2B is inoculated in an amount effective to lower the pH of the forage substrate to a pH at which the substrate is stabilized and rendered substantially free of butyric acid producing bacteria. By substantially free is meant that the populations of bacteria capable of producing butyric acid is reduced to a level at which butyric acid production is less than 5%, preferably less than 1%, of the total acid production. It is preferred that the pH be reduced to less than 4.5, preferably to less than 4.2, and most preferably to less than 4.0 within 2 days and preferrably within 24 hours. The amount of inoculated bacteria required for this pH reduction will vary depending on the amount of naturally occurring lactate-producing bacteria present in the forage crop when it is harvested. Admixture of $10^4$ to $10^9$ viable bacteria per gram of plant material is generally sufficient. A ratio of from $10^5$ to $10^8$ (and especially $10^6$ to $10^7$) bacteria per gram is preferred. There is no upper limit on the number of bacteria per gram added except that determined by cost effectiveness.

Although particular treatment of the forage substrate is not specifically required, the forage substrate is generally chopped or otherwise divided into relatively small parts during the collecting or processing steps of harvesting prior to inoculation with the *L. plantarum* 2B bacteria. Finely chopped material is easier to handle, stores more compactly, provides a greater surface area and release of nutrients for reaction and fermentation, and more efficiently packs to exclude air from the interior of the fermenting material than is possible with a coarsely chopped or unchopped forage. The size of the chopped forage substrate varies depending on the crop, but typically the ensiled material has a length of no more than 2.5 centimeters, preferably 1.75 centimeters, and more preferably 1.25 centimeters.

After admixing *L. plantarum* 2B with substrate in an otherwise known ensiling process, fermentation is allowed to proceed under anaerobic conditions until a silage stable to anaerobic storage is obtained. This time will vary depending on the type of forage used. A typical minimum time would be approximately one month, although periods of three weeks, or even 10 days, will be sufficient under ideal conditions. The fermentation process is self limiting, since the bacteria present normally or added are inhibited by pH reduction and their own waste products by the time sufficient fermentation has occurred. The resulting product, termed a silage, is thereafter stable to anaerobic storage. By stable is meant that no more than 10%, preferably 5%, loss of nutrients occurs after storage of one month as measured by the average nutrient loss of the individual nutrients.

The present invention comprises mixing *Lactobacillus plantarum* 2B with the substrate and allowing fermentation to proceed until a suitable silage is formed. However, in order to place this invention into perspective, the following typical example which begins with harvesting of the forage crop and continues through feeding of the silage to an animal is given for purposes of illustration only.

In this example, alfalfa will be used as the substrate. However, other materials would be handled in the same general manner differing only in well known details of harvesting and handling of the forage material. Plants are harvested by any typical harvester, for example, a six-knife forage harvester. Alfalfa would typically be harvested in the 20–40% bloom stage. Plants are chopped into relatively short pieces, for example, about 1.5 cm long. The harvested crop is transported to a silo or other storage container. Typically, the *L. plantarum* 2B inoculum would be added to the chopped forage as it is added to the silo or other storage container. Various methods for accomplishing this admixing are known and may be used in carrying out the process of the invention. For example, an aqueous suspension of *L. plantarum* 2B may be sprayed on the forage as it is added to the storage bin. Alternatively, a dry preparation of the inoculum, for example, *L. plantarum* 2B with a suitable solid carrier, such as rice hulls, may be added similarly to the forage. The forage containing admixed

*L. plantarum* 2B is covered or the storage container closed in such a way as to maximally exclude air from the fermenting forage. Fermentation is allowed to proceed for at least 10 days, preferably three weeks and more preferably a month. If desired, samples of forage may be withdrawn at intervals of time in order to determine whether or not fermentation is sufficient. However, a typical ensiling process carried out on a farm would not sample the silage at intermediate periods. At the end of the ensiling process, the silage is removed for feeding to a ruminant. The resulting silage has improved stability after opening the silo compared to silages prepared without admixing of *L. plantarum* 2B.

*Lactobacillus plantarum* 2B can be prepared in bulk by culturing in MRS broth or other suitable media at about 30° C. at a pH of about 5.8. MRS broth is a liquid microbiological medium containing yeast extract as a source of vitamins, minerals and other growth factors; trypticase as an amino acid source; sodium acetate; ammonium citrate; mineral salts; and sorbitan monooleate.

Other complete microbiological media providing similar nutrients of the same type can also be used.

Suitable inocula for application to a fermentable forage can be prepared by any standard method, typically by freeze-drying cultures and mixing with a solid carrier, such as rice or peanut hulls, cornmeal, non-fat dried milk, lactose, and similar materials, in order to produce a solid inoculum. Aqueous inocula can be prepared by diluting the original culture with water or another suitable aqueous carrier, such as phosphate buffer or cheese whey. If desired, a liquid inoculum can be stored in frozen form. Accordingly, the phrase "aqueous" or "liquid" inoculum as used herein refers to both frozen and fluid forms. A liquid inoculum can also be prepared by dissolving or suspending a soluble solid inoculum containing *L. plantarum* 2B, such as one prepared using lyphilized cheese whey as a carrier. If desired, the inoculum (solid or liquid) can be manufactured in concentration form which can be diluted by the ultimate user prior to application to a forage.

Having now generally described this invention, the same will be better understood by reference to certain specific examples which are included herein for purposes of illustration only and are not intended to be limiting of the invention or any embodiment thereof, unless specified.

EXAMPLE 1: SILAGE PRODUCTION FROM ALFALFA, WHEAT CORN AND SORGHUM

Material and Methods

Siliage Preparation

Plants were harvested by a six-knife forage harvester. Alfalfa was second cutting 20 to 40% bloom stage harvested in June. Wheat was in the early boot stage and was harvested in late April. Corn in the early dent stage was harvested in late July. Sorghum in the late dough stage was harvested in late August. Plants were chopped into approximately 1.5 cm long pieces and transported immediately after cutting to experimental silos for filling. Fifty-five kg of harvested forage was packed in 6-mil polyethylene bags and placed in 0.21 m³ steel drums. Care was taken to pack material to exclude air and to seal the bags. Eight drums for each control and each inoculated silage were prepared. Silage drums were placed in an unheated barn, and an average ambient temperature was measured for each silage (alfalfa 24° C., corn 25° C., sorghum 25° C., and wheat 17° C.). After 0, 1, 2, 4 (or 5), 8, 16, and 33 days of fermentation, one drum each for the treatment and control was opened for chemical and microbiological analysis.

Preparation of Inoculant

The *L. plantarum* 2B was prepared by culturing in 10 liters MRS broth in a New Brunswick 14-liter fermenter. This culture medium is described in Rogosa et al, *J. Bacteriol.*, 62, 132 (1951), which is herein incorporated by reference. Conditions of fermentation were temperature 30° C., pH 5.8, no aeration; moderate stirring was used to help maintain the fermentation temperature. After 48 h of culture, cells were harvested by centrifugation from the spent culture medium. Cells were resuspended in 100 ml of phosphate buffer (0.03 M, pH 7.2) and stored in polyethylene screw cap vials at $-20°$ C. for up to 3 months. At the time of inoculation, cells in storage vials were thawed rapidly in multiple changes of 17° C. water. A direct microscopic count of the population per milliliter of the thawed concentrated bacterial suspension was determined. Inoculum, $10^7$ *L. plantarum* per gram silage, was prepared from the culture concentrate by a suitable dilution in 700 ml of water and addition of 100 ml of this inoculum to each 55 kg of silage to be inoculated. The viable population of bacteria was determined by plating the inoculum immediately after preparation and after maintaining on ice at 4° C. during inoculation of silages.

The 100 ml of inoculant was sprayed on the silage with a thin layer chromatography plate sprayer. The 55 kg of silage was spread out on a plastic sheet (4×4 m), and the surface of the silage sprayed with about one-third of the inoculum. Silage and inoculum were mixed well, redistributed on the plastic, and sprayed and mixed twice more. Control silage was treated similarly without spraying. Inoculated and control silages then were packed carefully in the polyethylene bags in the 0.21 m³ drums.

Chemical Composition

At each sampling period the total weight of material recovered was measured and used to assess percent recovery of nutrients. Subsamples were oven-dried at 50° C. to assess percentage of moisture and were ground in a Wiley Mill to pass a 2-mm screen. Proximate analysis included fat, protein, ash, and nitrogen-free extract using standard methods of analysis approved by the American Association of Analytical Chemists. Acid detergent fiber (ADF), neutral detergent fiber (NDF), and permanganate lignin analyses were carried out according to methods described in Van Soest, *J. Assoc Offic. Anal. Chem.*, 46, 829 (1963); Van Soest et al, ibid., 50, 50 (1967); and Van Soest et al ibid., 51, 780 (1978), respectively. Water soluble carbohydrate (WSC) was determined by the method of Smith, *Agric. Food Chem.*, 20, 238 (1972). Measures of pH were on water extracts (10 g sample+90 ml $H_2O$, blended 1 min high speed Waring blender) by an electromark pH meter (Del Mar, CA). Volatile and nonvolatile fermentation acids were determined by gas chromatographic procedures as described in Moon et al, *J. Dairy Sci.*, 64, 807 (1981). Analyses were on days 0, 2, 4, 8, and 33. All chemical analyses were in duplicate on duplicate subsamples from each drum.

Microbiological Analysis

Two 100-g samples of silage were removed from the center of the silage bag, one from the upper half and one from the lower half. Samples were placed in sterile whirl pack bags, air was removed by compression, bags were sealed and moved promptly to the laboratory for microbiological analysis. A 10-g subsample of this silage was weighed aseptically into a sterile 200-ml blender jar. Ninety milliliters of 0.03 M dihydrogen-phosphate-buffered distilled water (pH 7.2) were added to the sample and blended in a Waring blender at high speed for 1 min. Serial dilutions were in the same phosphate buffered distilled water, and pour plates were prepared according to procedures outlined in the Standard Methods for the Examination of Dairy Products.

Microflora in the fermented material were evaluated in a manner similar to those of others who have defined bacterial populations in silages and to efforts to identify predominant microflora recovered in selective laboratory media in the inventor's laboratory published in Moon et al, *J. Dairy Sci.*, 64, 807 (1981).

Samples were plated in duplicate on selective and nonselective agars. Trypticase soy broth plus agar 1.5% (TSB+A) (Difco, Detroit, MI) was used as a general plating medium to recover facultative anaerobic or microaerophilic bacteria. Lactobacillus selective agar (LBS, Baltimore Biological Laboratory, MD) was used to recover Lactobaccilli. Azide dextrose broth+1.5% agar (AZD) was used to recover lactic acid cocci which were predominately streptococci. Plates were incubated in a reduced oxygen (15% $CO_2$, 85% air) atmosphere at 32° C. for 1 week before colonies were enumerated. Yeasts and molds were enumerated on the rose bengal chlortetracycline agar (YM) described by Jarvis, *J. Appl. Bacteriol.*, 36, 723 (1973). Coliforms were enumerated on violet red bile (VRB) agar. The YM was incubated aerobically at 30° C. for 1 wk and VRB for 48 h before enumeration of colonies.

Statistical Analysis

Statistical comparisons were between treatments over the entire fermentation period. Days were not compared as only one drum per treatment per day was prepared. Effect of the additive on pH and chemical composition was evaluated statistically using standard methods of analysis including these regression models: chemical composition=additive+day+day$^2$+(day X additive)+(day$^2$ X additive); and pH, log cells=additive+log day+day+(log day X additive)+(day X additive). The correlation coefficient of these models was generally above 0.70. Tests were for additive over the entire fermentation period at $P<0.05$. Duncan's multiple range test also was used to test for differences between treatment means. Data were analyzed as total weight per treatment and as percent of dry matter.

Results

Chemical compositions of fresh forages are in Table 1. All forage had initial pH between 5.2 and 5.7. Percent recoveries for the four crops of control and treated silages after 33 days are in Table 2. All silages had high recoveries of nutrients in fresh forage. Addition of inoculum increased recovery of dry matter, crude protein, and acid detergent fiber in alfalfa silage but decreased nitrogen-free extract in wheat silage. Recovery of nutrients in corn and sorghum silage was not affected by addition of inoculum.

Lactic acid and volatile fatty acid anaylsis of silages is in Table 3. Lactic acid was increased ($P<0.05$) in alfalfa and wheat silages by addition of *L. plantarum* 2B. Succinic acid was decreased ($P<0.05$) in alfalfa and wheat silages with addition of *L. plantarum* 2B. Wheat silage also showed increased acetic acid ($P<0.05$) with addition of *L. plantarum* 2B. There were no significant differences in any of the fermentation acids in corn or sorghum silages. Only in alfalfa control silage was any butyric acid produced ($P<0.05$).

Figure 2:
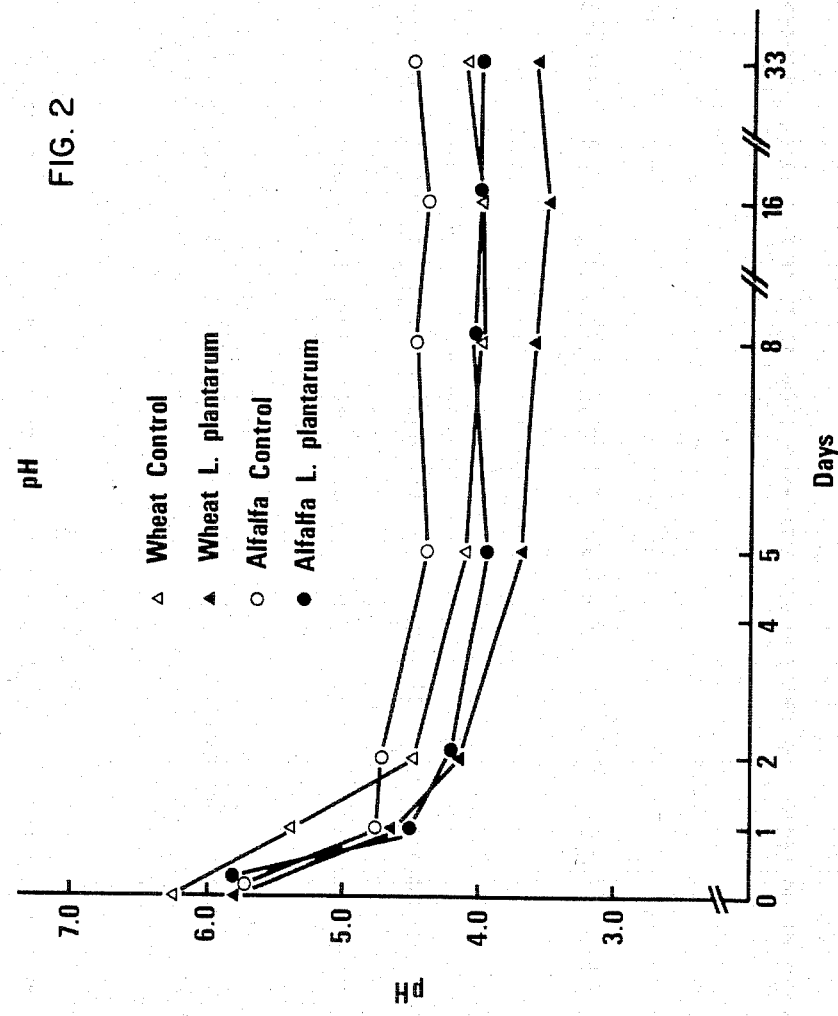
FIG. 2 shows a plot of silage pH for alfalfa and wheat silages versus time.

The change in pH over time for corn and sorghum silage (FIG. 1) was not significantly affected by addition of *L. plantarum* 2B (Table 4). The pH dropped rapidly to approximately 3.7 by 1 day and remained this low throughout the remainder of the fermentation period. Addition of *L. plantarum* 2B lowered pH ($P<0.05$, Table 4) of alfalfa and wheat silages (FIG. 2). The difference was seen by day 2 and remained through the fermentation period.

Figure 3:
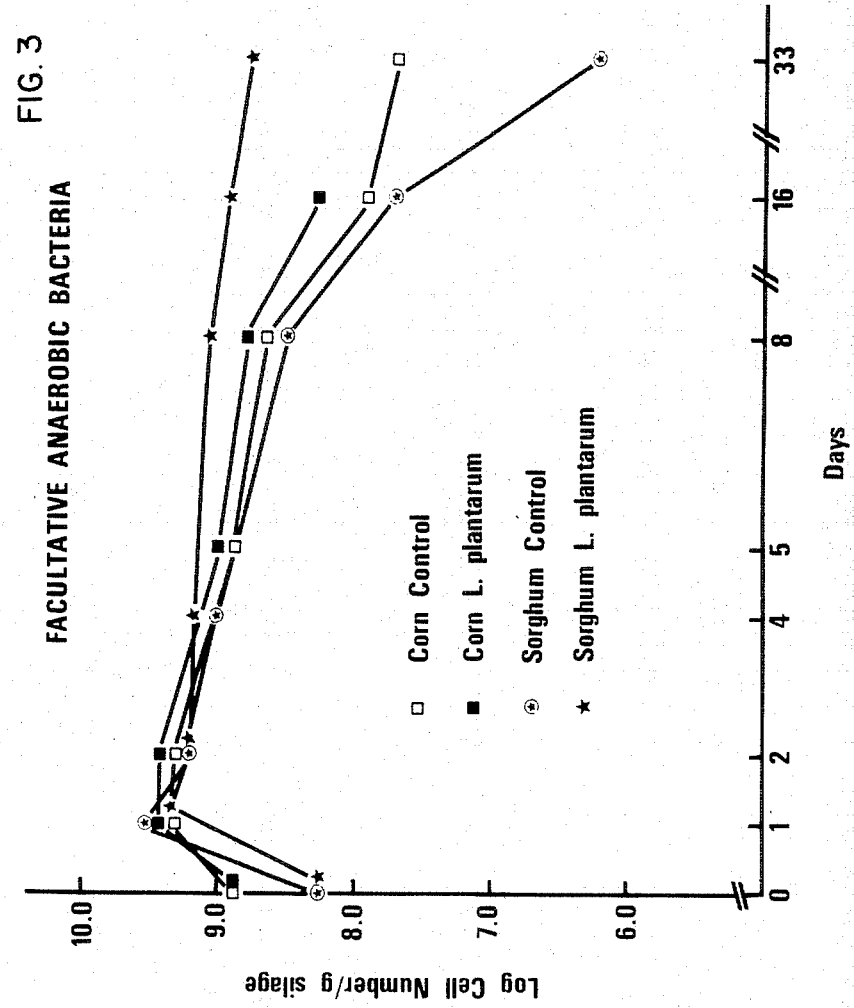
FIG. 3 shows a plot of facultative anaerobic bacteria recovered from corn and sorghum silages versus time.
Figure 4:
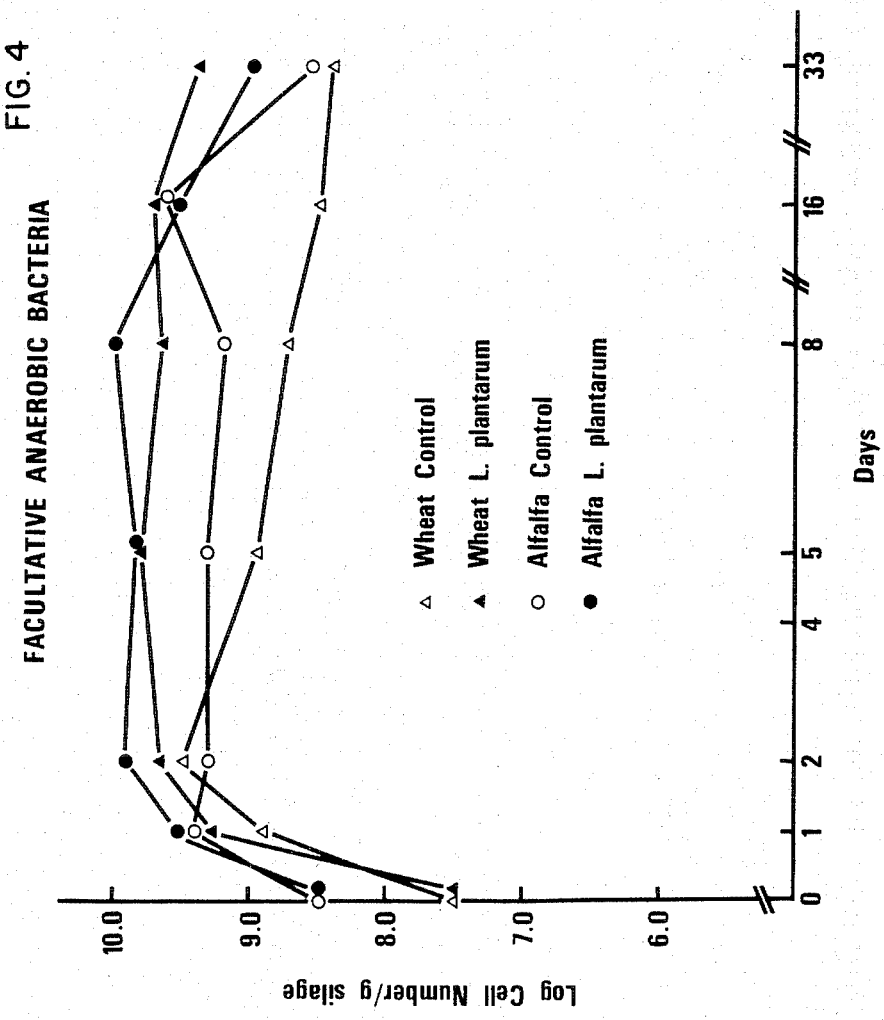
FIG. 4 shows a plot of faculative anaerobic bacteria recovered from alfalfa and wheat silages versus time.
Figure 5:
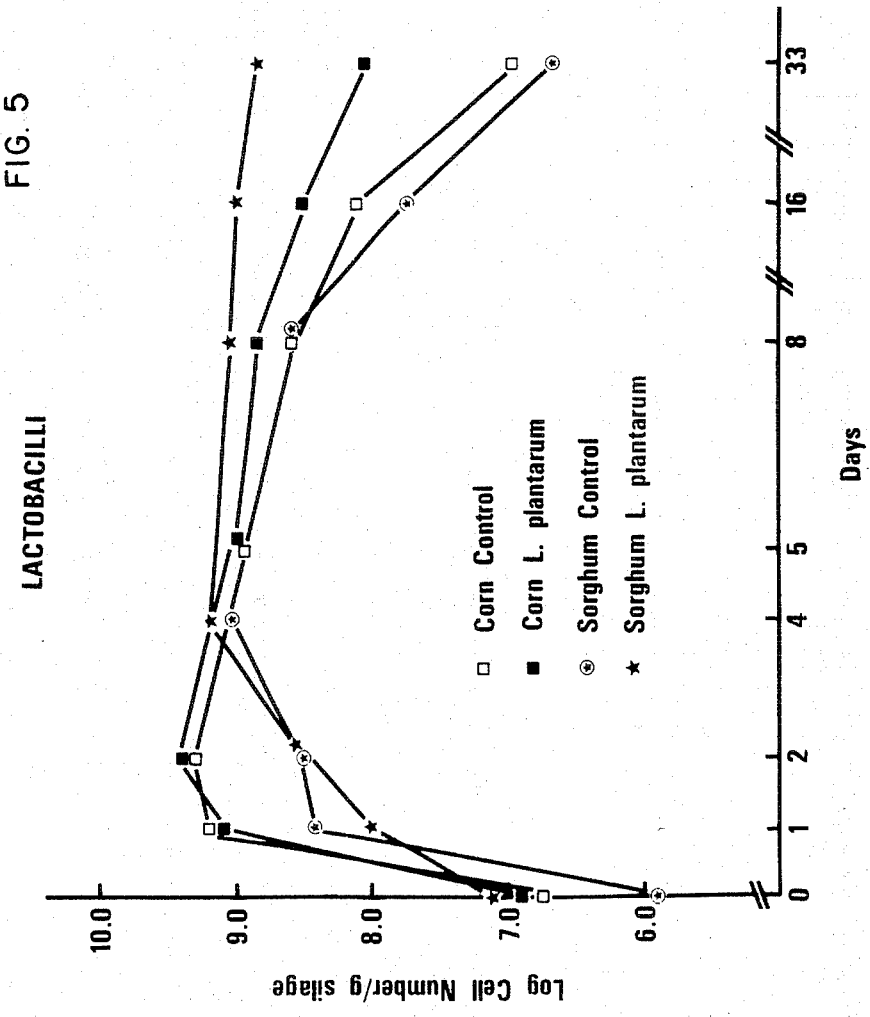
FIG. 5 shows a plot of lactobacilli recovered on LBS agar from corn and sorghum silages versus time.
Figure 6:
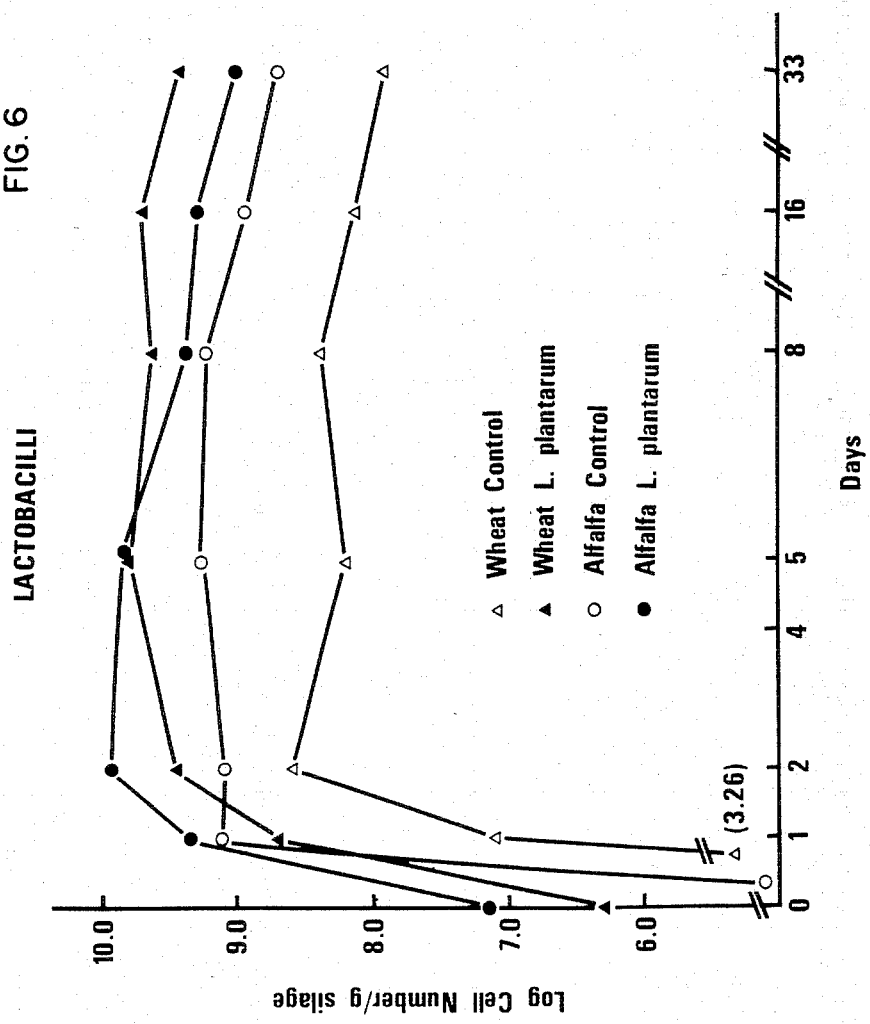
FIG. 6 shows a plot of lactobacilli recovered on LBS agar from alfalfa and wheat silages versus time.
Figure 7:
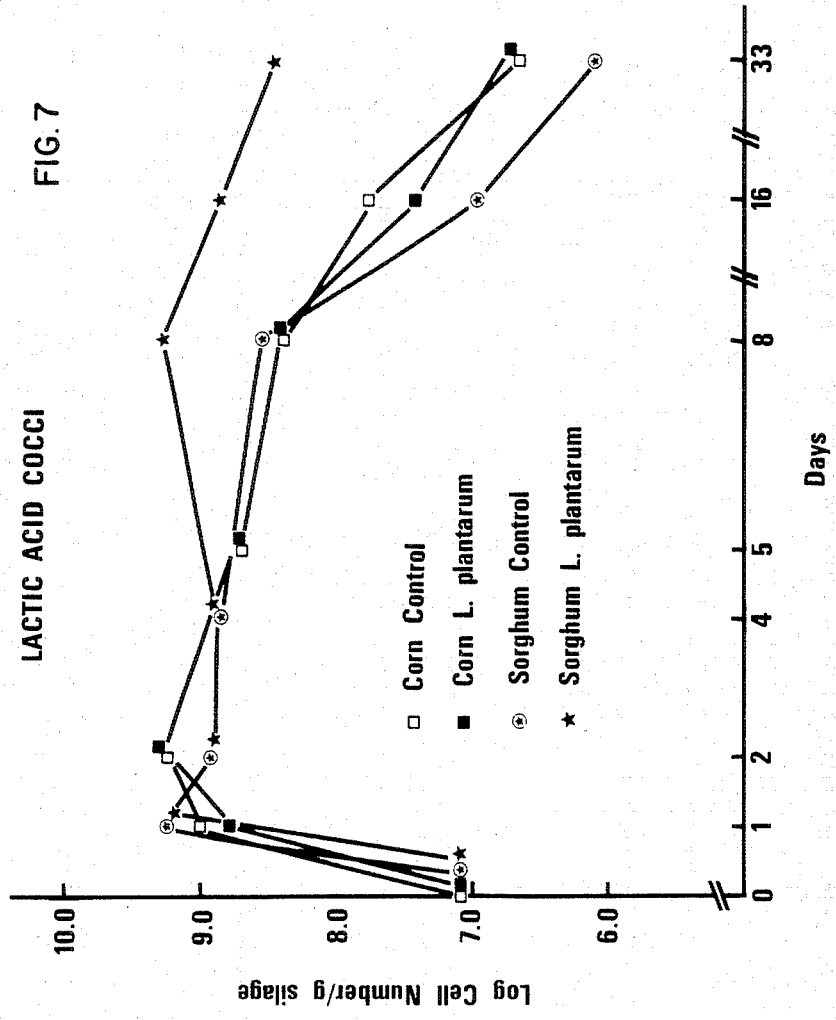
FIG. 7 shows a plot of lactic acid cocci recovered on azide dextrose agar from corn and sorghum silages versus time.
Figure 8:
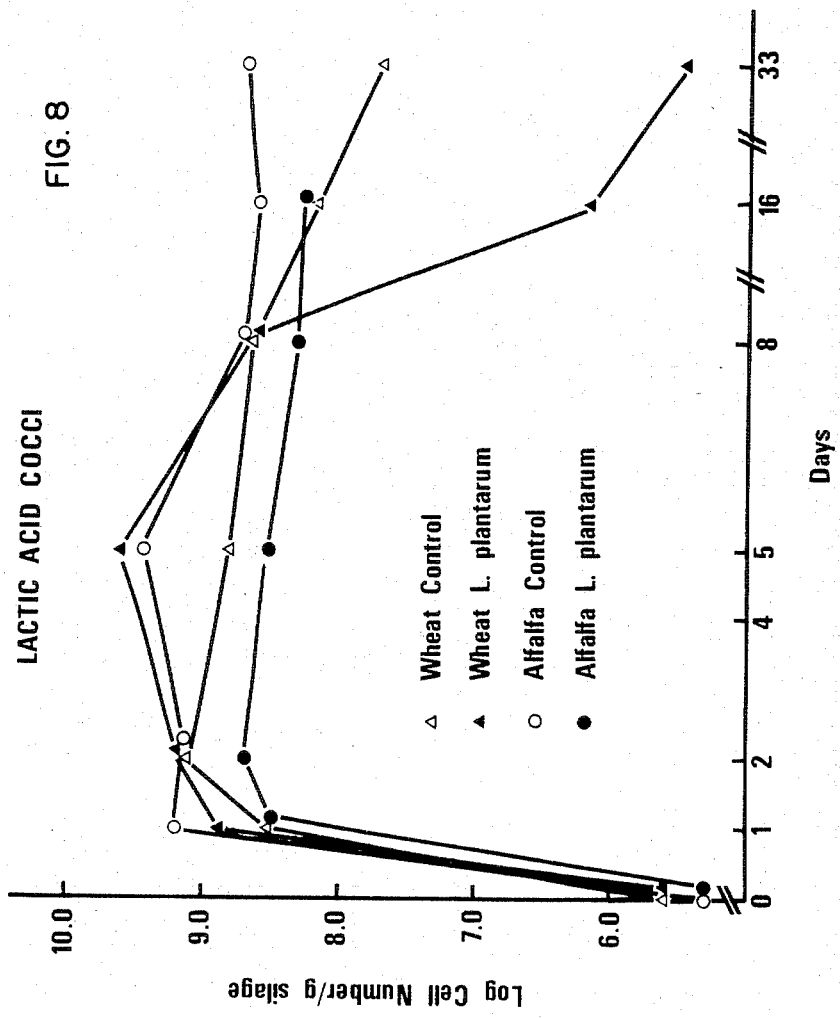
FIG. 8 shows a plot of lactic acid cocci recovered on axide dextrose agar from alfalfa and wheat silages versus time.
Figure 9:
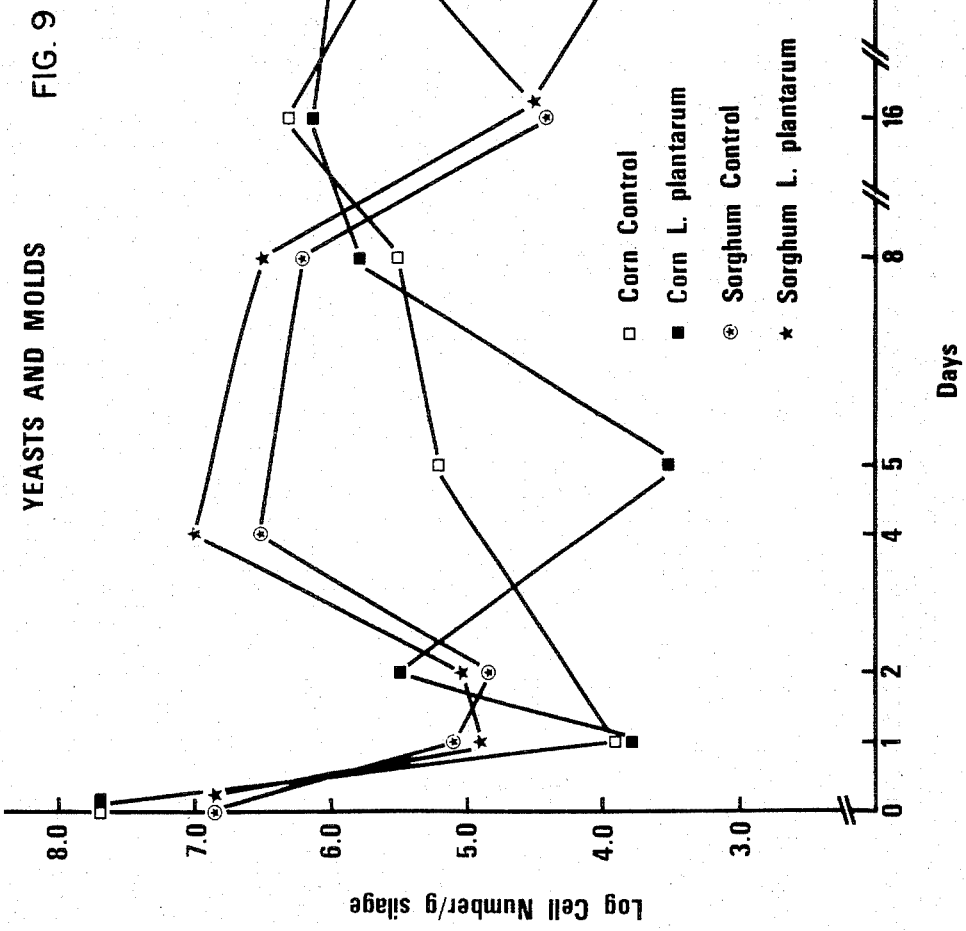
FIG. 9 shows a plot of yeast and molds recovered on rose bengal chlortetracycline agar from corn and sorghum silages versus time.
Figure 10:
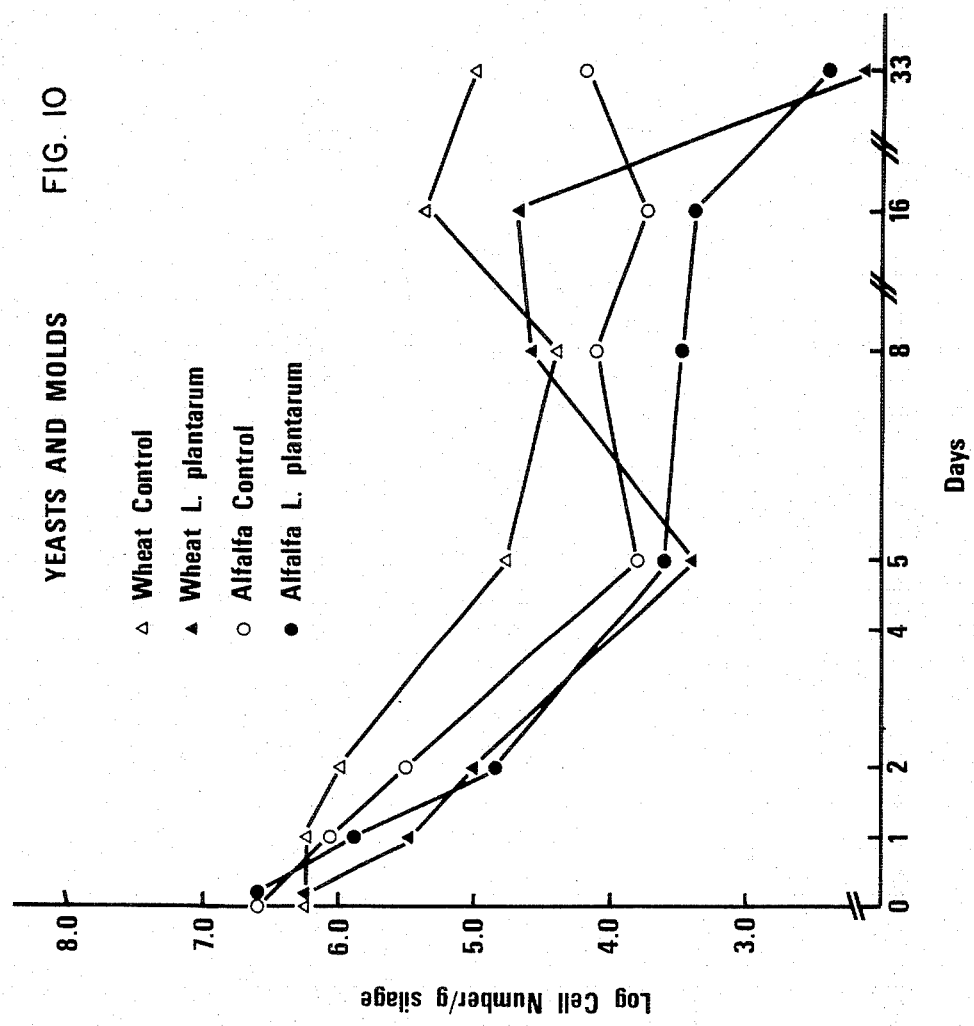
FIG. 10 shows a plot of yeast and molds recovered on rose bengal chlortetracycline agar from alfalfa and wheat silages versus time.

Facultative anaerobic bacteria were increased ($P<0.05$) by day 32 for alfalfa, corn, sorghum, and wheat silages with addition of *L. plantarum* 2B (FIGS. 3, 4, Table 4). Populations in corn and sorghum silages reached a maximum after 1 day and then declined. Populations in alfalfa and wheat silages reached maximum later in fermentation (FIG. 4). Total lactobacilli counts were increased ($P<0.05$) by addition of *L. plantarum* 2B in alfalfa, wheat, and sorghum silages but not in corn silage (FIGS. 5, 6, Table 4). Initial populations of lactobacilli were much lower ($10^3$ to $10^5$/g) in control silages of alfalfa and wheat (FIG. 6) than inoculated silages. Initial populations of lactobacilli were $10^6$ to $10^7$/g in corn and sorghum silages which was similar to inoculum. Populations of lactic acid cocci recovered on azide dextrose agar were similar in all silages (FIGS. 7, 8, Table 4). Yeast and mold counts were lowered ($P<0.05$) by addition of *L. plantarum* 2B in alfalfa and wheat silages (FIGS. 9, 10, Table 4), but it did not have a significant effect on corn or sorghum silages.

TABLE 1

Chemical composition of alfalfa, corn, sorghum, and wheat forages

|  | Alfalfa | Corn | Sorghum | Wheat |
|---|---|---|---|---|
| pH | 5.74 | 5.24 | 5.40 | 5.79 |
| Dry matter, % | 32.4 | 35.0 | 27.5 | 25.0 |
| Crude protein[a] | 16.7 | 7.0 | 6.1 | 10.2 |
| Soluble carbohydrate[a] | 11.1 | 42.7 | 64.4 | 42.4 |
| Crude fat[a] | 2.2 | 1.6 | 1.4 | 1.6 |
| Crude fiber[a] | 20.5 | 19.4 | 23.2 | 33.0 |
| Nitrogen free extract[a] | 49.8 | 59.8 | 60.1 | 43.3 |
| Neutral detergent fiber[a] | 50.3 | 42.1 | 52.9 | 58.0 |
| Acid detergent fiber[a] | 33.9 | 20.0 | 20.5 | 38.4 |

[a]Percent of dry matter

TABLE 2

Effect of addition of *Lactobacillus plantarum* to silage on percent recovery or nutrients at the end of the fermentation period.

| | | Treatment | |
|---|---|---|---|
| Component[a] | Silage | Control | *Lactobacillus plantarum* |
| Dry matter | Alfalfa | 89.6 | 93.7[b] |
| Crude protein | | 82.6 | 95.6[b] |
| Soluble carbohydrate | | 56.5 | 60.8 |
| Crude fat | | 100.2 | 100.2 |
| Crude fiber | | 100.0 | 100.0 |
| Nitrogen free extract | | 65.0 | 66.0 |
| Neutral detergent fiber | | 99.0 | 100.3 |
| Acid detergent fiber | | 90.7 | 100.1[b] |
| Dry matter | Corn | 97.5 | 99.5 |
| Crude protein | | 100.0 | 100.0 |
| Soluble carbohydrates | | 33.1 | 24.4 |

TABLE 2-continued

Effect of addition of *Lactobacillus plantarum* to silage on percent recovery or nutrients at the end of the fermentation period.

| Component[a] | Silage | Treatment Control | Lactobacillus plantarum |
|---|---|---|---|
| Crude fat | | 100.0 | 100.0 |
| Crude fiber | | 100.0 | 100.0 |
| Nitrogen free extract | | 98.0 | 94.0 |
| Neutral detergent fiber | | 90.5 | 94.4 |
| Acid detergent fiber | | 100.0 | 100.0 |
| Dry matter | Sorghum | 100.0 | 100.6 |
| Crude protein | | 100.5 | 100.5 |
| Soluble carbohydrate | | 12.5 | 14.1 |
| Crude fat | | 100.0 | 100.0 |
| Crude fiber | | 100.0 | 100.0 |
| Nitrogen free extract | | 100.0 | 99.0 |
| Neutral detergent fiber | | 100.0 | 100.0 |
| Acid detergent fiber | | 67.6 | 63.8 |
| Dry matter | Wheat | 100.0 | 100.0 |
| Crude protein | | 100.0 | 100.0 |
| Soluble carbohydrates | | 25.5 | 23.4 |
| Crude fat | | 100.0 | 100.0 |
| Crude fiber | | 100.0 | 100.0 |
| Nitrogen free extract | | 99.2 | 97.0[b] |
| Neutral detergent fiber | | 100.0 | 100.6 |
| Acid detergent fiber | | 90.0 | 100.0 |

[a]Recovery of nutrients is calculated as a percentage of the fresh forage at day 0 vs 33
[b]Percents followed by b differed (P < .05) from the control over the entire fermentation period

TABLE 3

Fermentation acids (mM/g silage wet wt) produced during ensiling

| Silage | Additive | Acid | 0 | 2 | 4 | 8 | 33 |
|---|---|---|---|---|---|---|---|
| Alfalfa | None | Acetic | 1.07 | 21.49 | 40.74 | 33.86 | 39.46 |
| | | Propionic | ...[a] | ... | ... | ... | .61 |
| | | Lactic | ... | 14.29 | 18.51 | 23.83 | 29.86 |
| | | Butyric | ... | ... | ... | .51 | 17.40 |
| | | Isobutyric | ... | ... | ... | ... | ... |
| | | Valeric | ... | ... | ... | ... | ... |
| | | Isovaleric | ... | ... | ... | ... | ... |
| | | Succinic | .30 | 2.73 | 3.95 | 4.72 | 4.36 |
| | L. plantarum | Acetic | 1.59 | 11.19 | 20.69 | 43.21 | 57.29[b] |
| | | Propionic | ... | ... | ... | ... | ...[b] |
| | | Lactic | ... | 24.89 | 32.69 | 29.75 | 36.00[b] |
| | | Butyric | ... | ... | ... | ... | ...[b] |
| | | Isobutyric | ... | ... | ... | ... | ... |
| | | Valeric | ... | ... | ... | ... | ... |
| | | Isovaleric | ... | ... | ... | ... | ...[b] |
| | | Succinic | .33 | .86 | 1.13 | .91 | 1.06[b] |
| Corn | Control | Acetic | ... | 36.53 | 39.97 | 48.07 | 35.70 |
| | | Propionic | ... | ... | .01 | .01 | .22 |
| | | Lactic | ... | 41.79 | 51.32 | 55.89 | 42.63 |
| | | Butyric | ... | ... | ... | ... | ... |
| | | Isobutyric | ... | ... | ... | ... | ... |
| | | Valeric | ... | ... | ... | ... | ... |
| | | Isovaleric | ... | ... | ... | ... | ... |
| | | Succinic | .22 | 1.65 | 1.93 | 1.44 | 1.20 |
| | L. plantarum | Acetic | .79 | 33.17 | 47.75 | 50.87 | 39.74[b] |
| | | Propionic | ... | .03 | ... | .06 | .44[b] |
| | | Lactic | .18 | 39.75 | 47.65 | 47.85 | 38.95[b] |
| | | Butyric | ... | ... | ... | ... | ... |
| | | Isobutyric | ... | ... | ... | ... | ... |
| | | Valeric | ... | ... | ... | ... | ... |
| | | Isovaleric | ... | ... | ... | ... | ... |
| | | Succinic | .21 | 1.29 | 1.23 | 1.09 | 1.11[b] |
| Sorghum | Control | Acetic | .25 | 48.83 | 43.03 | 58.30 | 33.70 |
| | | Propionic | ... | ... | ... | .70 | .38 |
| | | Lactic | ... | 23.65 | 44.06 | 42.30 | 33.61 |
| | | Butyric | ... | ... | ... | ... | ... |
| | | Isobutyric | ... | ... | ... | ... | ... |
| | | Valeric | ... | ... | ... | ... | ... |
| | | Isovaleric | ... | ... | ... | ... | ... |
| | | Succinic | .16 | .11 | 1.17 | 1.40 | 1.21 |
| | L. plantarum | Acetic | .69 | 46.18 | 30.47 | 42.88 | 58.45[b] |
| | | Propionic | ... | ... | ... | .25 | .47[b] |
| | | Lactic | ... | 22.27 | 41.73 | 41.64 | 34.67 |
| | | Butyric | ... | ... | ... | ... | ... |
| | | Isobutyric | ... | ... | ... | ... | ... |
| | | Valeric | ... | ... | ... | ... | ... |
| | | Isovaleric | ... | ... | ... | ... | ... |
| | | Succinic | ... | 1.22 | 1.19 | ... | 1.27 |
| Wheat | Control | Acetic | .49 | 15.29 | 25.10 | 29.89 | 35.34 |
| | | Propionic | ... | ... | ... | ... | ... |
| | | Lactic | ... | 14.54 | 26.88 | 26.61 | 33.21 |
| | | Butyric | ... | ... | ... | ... | ... |
| | | Isobutyric | ... | ... | ... | ... | ... |
| | | Valeric | ... | ... | ... | ... | ... |
| | | Isovaleric | ... | ... | ... | ... | ... |
| | | Succinic | ... | 6.49 | 5.93 | 6.65 | 6.72 |
| | L. plantarum | Acetic | ... | 10.11 | 19.33 | 45.25 | 40.65[b] |
| | | Propionic | ... | ... | ... | ... | ... |
| | | Lactic | ... | 21.29 | 43.28 | 36.02 | 54.40[b] |
| | | Butyric | ... | ... | ... | ... | ... |
| | | Isobutyric | ... | ... | ... | ... | ... |
| | | Valeric | ... | ... | ... | ... | ... |
| | | Isovaleric | ... | ... | ... | ... | ... |
| | | Succinic | .39 | 2.80 | 3.81 | 4.58 | 2.49[b] |

[a]Less than .01 mM/g silage wet weight.
[b]Means followed by b differed (P < .05) from the control over the entire fermentation period. Standard errors of means of duplicate determinations are acetate 2.08, propionate .02, lactate 1.92, butyrate .31, isobutyrate .01, valerate .01, isovalerate .02, succinate .22.

TABLE 4

Effect of inoculation of alfalfa, corn, sorghum, and wheat silages with *Lactobacillus plantarum* 2B on mean pH and microbial populations ($\log_{10}$ cell number/g silage) recovered on four different agar media.

| Silage | Treatment | pH | Agar medium[a] | | | |
|---|---|---|---|---|---|---|
| | | | Axide dextrose | LBS | TSB + A | YM |
| Alfalfa | Control | 4.71 | 8.35 | 8.41 | 9.09 | 4.76 |
| | L. plantarum | 4.36[bc] | 7.89 | 9.12[c] | 9.46[bc] | 4.25[bc] |
| Corn | Control | 3.74 | 8.05 | 8.25 | 8.59 | 5.14 |
| | L. plantarum | 3.77 | 8.22 | 8.52 | 8.97[bc] | 5.39 |
| Sorghum | Control | 3.74 | 7.95 | 7.83 | 8.35 | 5.57 |
| | L. plantarum | 3.79 | 8.66[bc] | 8.45[bc] | 8.97[bc] | 5.39 |
| Wheat | Control | 4.62 | 8.08 | 7.35 | 8.63 | 5.35 |
| | L. plantarum | 4.14[bc] | 8.03 | 8.96[bc] | 9.28[bc] | 4.45[bc] |

[a]Agar medium. Azide dextrose for lactic acid cocci, LBS for lactobacilli, TSB + A for total facultative anaerobes, YM for yeasts and molds.
[b,c]Means followed by b differed (P < .05) from control silages as determined by a Ducan's tests of treatment means; when followed by c, means differed (P < .05) from control silages using linear regression models determined over the 33 day fermentation period. The standared error of the means of duplicate determinations was azide dextrose .288, LBS .189, TSB + A .288, YM .288, pH .075.

EXAMPLE 2: STABILITY OF SILAGE AFTER OPENING SILO

Figure 11:
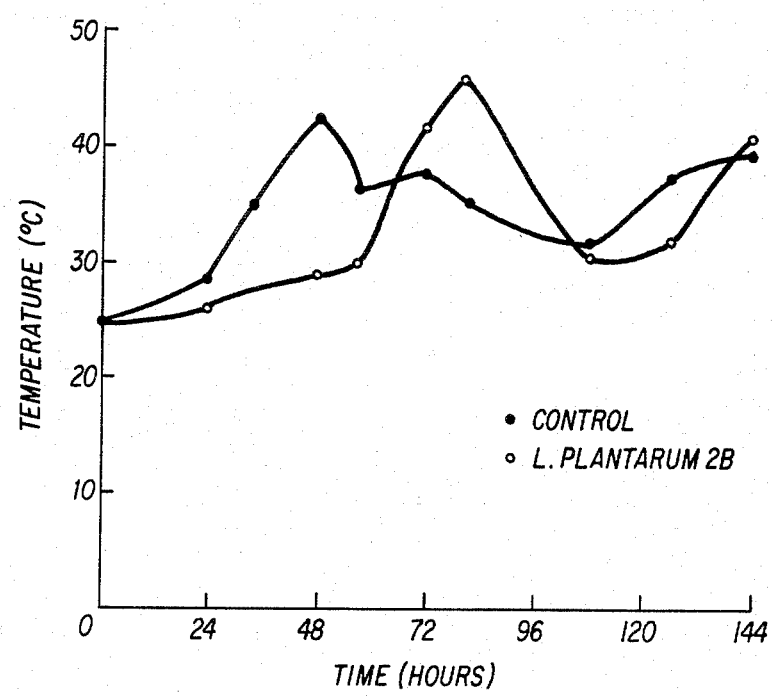
FIG. 11 shows a plot of temperature versus time after opening of the silo and exposure to air for a silage prepred with the addition of L. plantarum 2B and a control silage.
Figure 12:
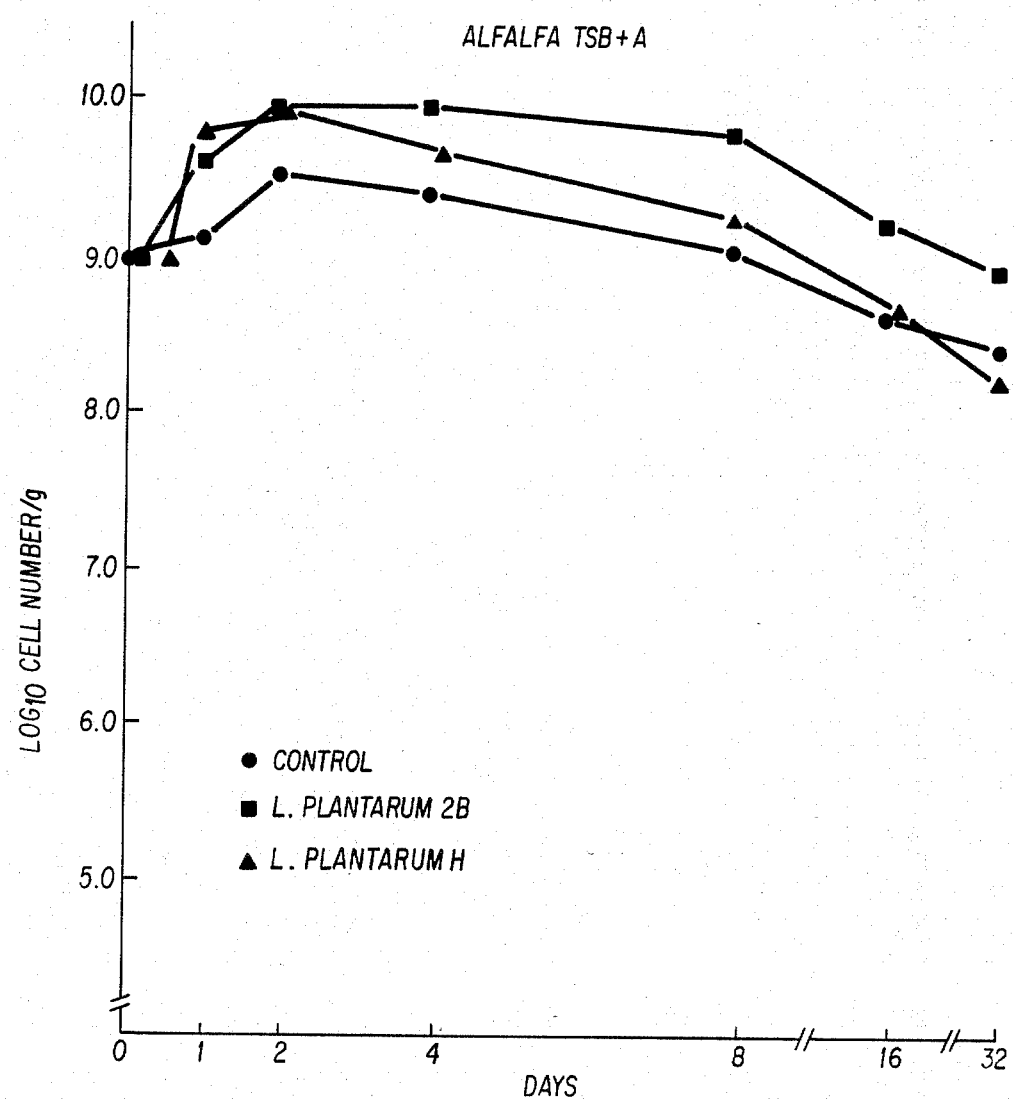
FIG. 12 shows a plot of microaerophilic populations in alfalfa silage versus time.
Figure 13:
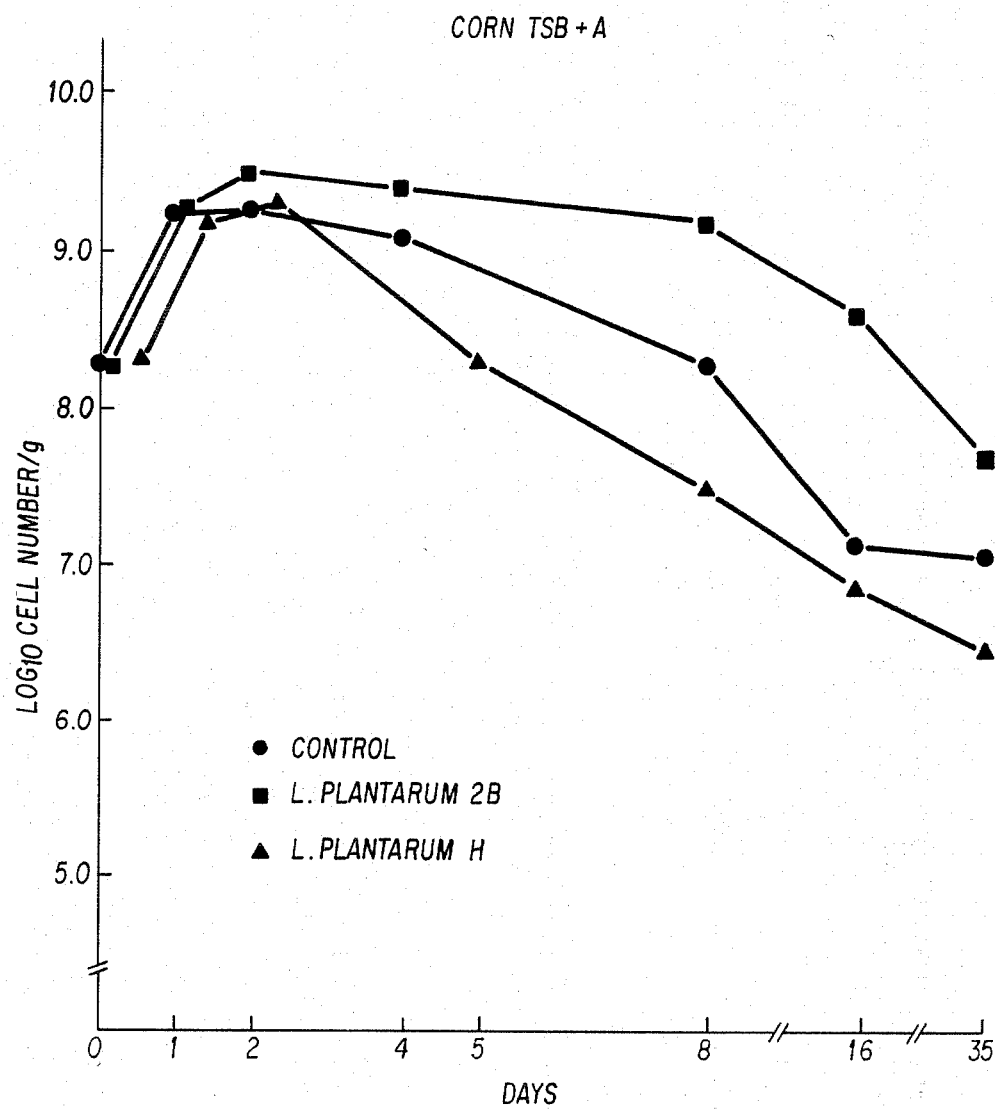
FIG. 13 shows a plot of microaerophilic populations in corn silage versus time.
Figure 14:
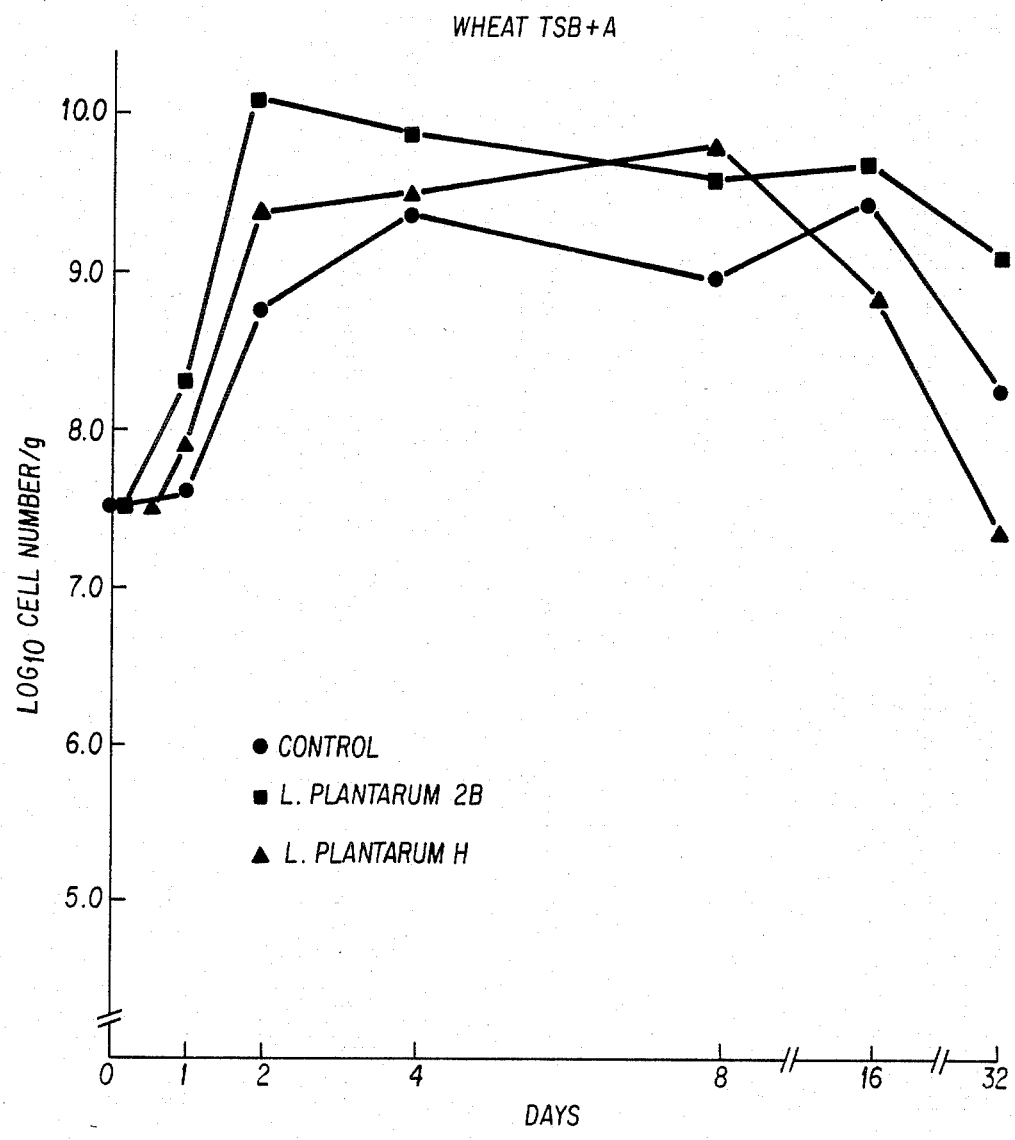
FIG. 14 shows a plot of microaerophilic populations in wheat silge versus time.
Figure 15:
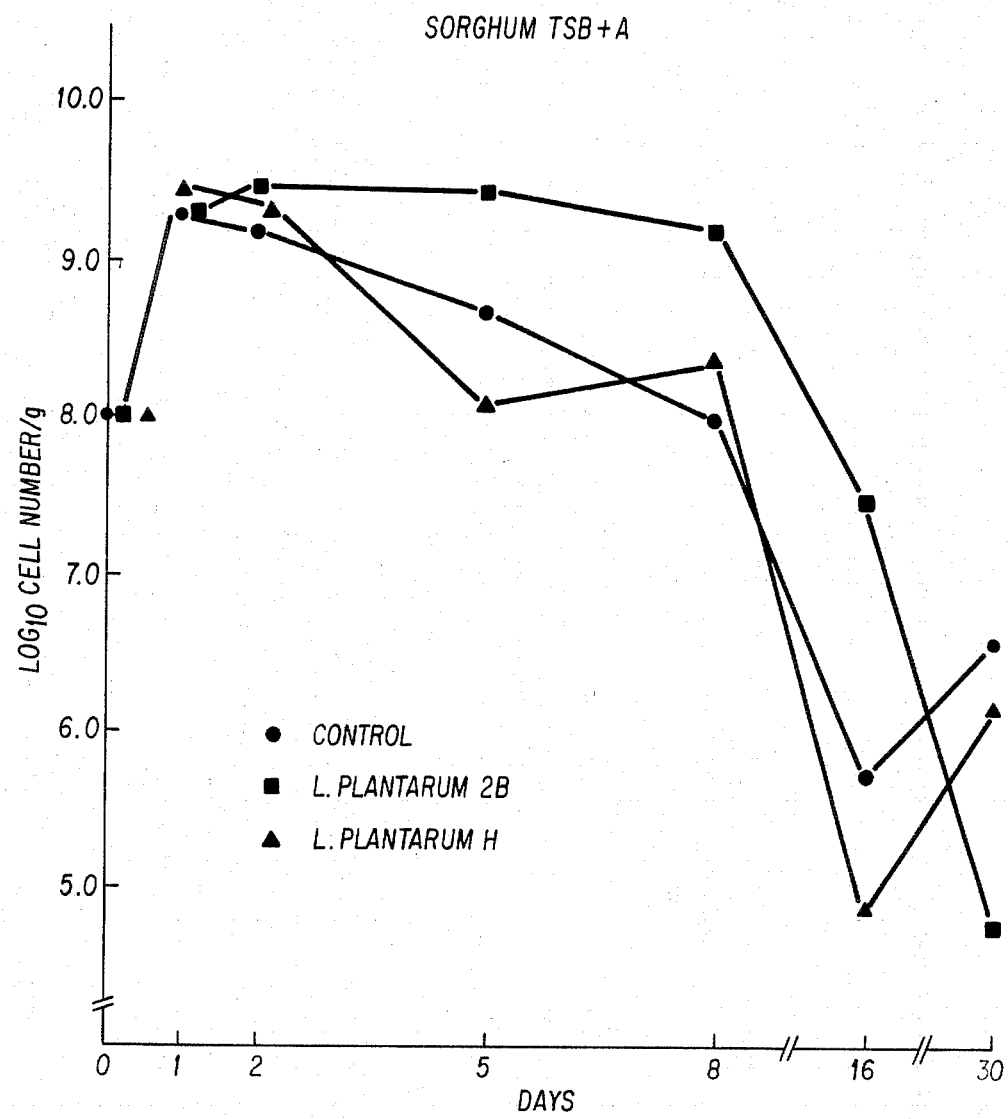
FIG. 15 shows a plot of microaerophilic populations in sorghum silage versus time.

A corn silage of the invention and a corn silage control were prepred as describe in Example 1. The silos were then opened and the temperatures were measured at intervals as shown in the following Table and in FIG. 11.

TABLE 5

Effect of inoculation of corn silage with *L. plantarum* 2B on stability of silage after opening

| Silage | Temperature (°C.) at indicated time (hrs) after opening | | | | | | | | | | |
|---|---|---|---|---|---|---|---|---|---|---|---|
| | 0 | 6 | 24 | 32 | 48 | 56 | 72 | 80 | 106 | 126 | 144 |
| Control | 25 | 26.4 | 28.2 | 35.2 | 42.7 | 36.2 | 37.5 | 35.9 | 33.6 | 37.1 | 39.2 |
| *L. plantarum* | 25 | 26.1 | 26.3 | 26.8 | 28.2 | 29 | 42.4 | 46.4 | 32.6 | 32.4 | 40.2 |
| (ambient temperature) | 25 | 25.2 | 26.0 | 26.0 | 26.3 | 25.9 | 26.2 | 25.9 | 27.4 | — | 26.9 |

Temperature is a measure of stability of the forage after opening as heat is generated by yeasts and molds after the silage is exposed to air. The nearly two day lag in reaching maximum temperature after opening indicates greater stability for the silage prepared according to the invention over a silage prepared without inoculation of *L plantarum* 2B.

EXAMPLE 3: COMPARISON OF SILAGES OF THE INVENTION WITH SILAGES PREPARED USING A DIFFERENT STRAIN OF *L. PLANTARUM*

Silages were prepared as described in Example 1. The comparision inoculum (designated *L. plantarum* H) was received from Chr. Hansen's Laboratory, Inc., 9015 W. Maple St., Milwaukee, Wis. 53214, on dry ice and immediately transferred to a −20° C. freezer and stored until the day of silage preparation. The cans of inoculum were thawed by placing in room temperature (17° C.) water for about 15 min. The cans were suface sterilized with alcohol, flamed and opened. A direct microscopic count of the population per ml in each can was determined. A level of inoculum of *L. plantarum H* equal to that used with *L. plantarum* 2B was prepared from the culture concentrate by adding 50 ml of the concentrate to 700 ml of water and adding 100 ml of this to 55 kg of silage giving an approximate level of inoculum of $10^7$/g silge. *L. plantarum* 2B was treated as described in Example 1. Experimental procedures are also described in Example 1.

TABLE 6

Effect of inoculation of the silage with *L. plantarum* on the percent recovery[a] of nutrients at the end of fermentation period

| Component | Silage | Control | Additive[b] LpH | Lp2B |
|---|---|---|---|---|
| Weight | Alfalfa | 87.45 | 97.87 | 94.43 |
| Dry matter | | 100.00 | 101.37 | 100.17 |
| Protein | | 77.88 | 97.87 | 84.11 |
| Soluble carbohydrate | | 98.88 | 108.32 | 111.29 |
| Fat | | 116.68 | 130.61 | 148.87 |
| Crude fiber | | 79.87 | 100.47 | 88.16 |
| Nitrogen free extract | | 91.11 | 93.48 | 94.69 |
| Neutral detergent fiber | | 94.88 | 99.95 | 102.47 |
| Acid detergent fiber | | 85.08 | 95.23 | 102.09 |
| Weight | Corn | 98.67 | 101.87 | 96.74 |
| Dry matter | | 100.00 | 98.70 | 101.34 |
| Protein | | 108.87 | 101.26 | 105.63 |
| Soluble carbohydrate | | 48.26 | 34.08 | 46.02 |
| Fat | | 100.37 | 103.02 | 93.73 |
| Crude Fiber | | 69.86 | 80.06 | 66.62 |
| Nitrogen free extract | | 138.30 | 135.01 | 137.52 |
| Neutral detergent fiber | | 86.33 | 98.09 | 90.69 |
| Acid detergent fiber | | 89.12 | 97.99 | 87.37 |
| Weight | Sorghum | 90.07 | 91.13 | 90.09 |
| Dry matter | | 100.00 | 93.67 | 96.67 |
| Protein | | 88.23 | 91.13 | 87.33 |
| Soluble carbohydrate | | 25.76 | 26.06 | 28.71 |
| Fat | | 98.38 | 99.19 | 81.30 |
| Crude Fiber | | 88.24 | 91.13 | 84.59 |
| Nitrogen free extract | | 91.27 | 93.36 | 93.89 |
| Neutral detergent fiber | | 94.57 | 94.17 | 96.10 |
| Acid detergent fiber | | 96.50 | 104.15 | 102.96 |
| Weight | Wheat | 95.07 | 101.05 | 96.28 |
| Dry matter | | 102.88 | 101.32 | 103.95 |
| Protein | | 93.55 | 100.05 | 96.29 |
| Soluble carbohydrate | | 29.11 | 35.70 | 33.74 |
| Fat | | 234.33 | 197.63 | 219.09 |
| Crude fiber | | 107.79 | 88.67 | 101.12 |
| Nitrogen free extract | | 72.92 | 98.73 | 81.05 |
| Neutral detergent fiber | | 85.40 | 98.36 | 88.13 |
| Acid detergent fiber | | 83.55 | 93.99 | 93.37 |

[a]% recovery (total amount in drum Day 32)/(Total amount in drum Day 0) × 100
[b]LpH = Lactobacillus plantarum H, Lp2B = Lactobacillus plantarum 2B As can be seen from an examination of Table 6, the nutrient values present in the resulting silages were comparable, apparently since all silages were prepared under optimum conditions. However, *L. plantarum* 2B gave better control of the total population of anaerobic bacteria present during fermentation for all silages as shown in FIGS. 12–15. These figures show total microaerophilic populations in silages (as demonstrated on a trypticase soy broth plus agar medium described in Example 1). In all cases the total microaerophilic populations is higher for *L. plantarum* 2B than it is for *L. plantarum H* during the initial stages of fermentation, indicating that *L. plantarum* 2B is superior at controlling the total population of anaerobic bacteria during fermentation. This control is believed to be important for silages prepared under non-optimal conditions, as would typically occur on a farm.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States:

1. A method for the production of silage from a fermentable forage substrate suitable for use as an animal feedstuff, comprising:
    admixing *Lactobacillus plantarum* 2B bacteria with a fermentable forage substrate, said bacteria being added in an amount effective to lower the pH of said forage substrate to a pH at which said fermentable forage is stabilized and rendered substantially free of butyric acid producing bacteria; and allowing fermentation to proceed under anerobic conditions until a silage stable to anaerobic storage is obtained.

2. The method of claim 1, wherein the bacteria is admixed with said substrate at a ratio of from $10^4$ to $10^9$ viable bacteria per gram of substrate.

3. The method of claim 2, wherein the ratio is from $10^6$ to $10^7$.

4. The method of claim 1, wherein the substrate is corn.

5. The method of claim 1, wherein the substrate is sorghum.

6. The method of claim 1, wherein the substrate is wheat.

7. The method of claim 1, wherein the substrate is alfalfa.

8. The method of claim 1, wherein said bacteria are admixed in the form of a suspension in water.

9. The method of claim 1, wherein said bacteria are admixed on the form of a solid inoculum.

* * * * *